United States Patent
French (10) Patent No.: US 12,041,454 B1
(45) Date of Patent: Jul. 16, 2024

(54) VULNERABILITY DETECTION AND MITIGATION IN CELLULAR NETWORKS

(71) Applicant: Casey French, Northport, NY (US)

(72) Inventor: Casey French, Northport, NY (US)

(*) Notice: Subject to any disclaimer, the term of this patent is extended or adjusted under 35 U.S.C. 154(b) by 0 days.

(21) Appl. No.: 18/403,397

(22) Filed: Jan. 3, 2024

Related U.S. Application Data (60) Provisional application No. 63/602,247, filed on Nov. 22, 2023.

(51) Int. Cl.
*H04W 12/10* (2021.01)
*H04W 12/12* (2021.01)
*H04W 24/10* (2009.01)

(52) U.S. Cl.
CPC ........... *H04W 12/12* (2013.01); *H04W 12/10* (2013.01); *H04W 24/10* (2013.01)

(58) Field of Classification Search
CPC ...... H04W 12/12; H04W 12/10; H04W 24/10
See application file for complete search history.

(56) References Cited

U.S. PATENT DOCUMENTS

| | | | |
|---|---|---|---|
| 2021/0258792 A1* | 8/2021 | Rodriguez Bravo | H04W 24/04 |
| 2023/0370445 A1* | 11/2023 | Bradbury | H02J 3/144 |

* cited by examiner

*Primary Examiner* — Chuong A Ngo
(74) *Attorney, Agent, or Firm* — Scale LLP (57) ABSTRACT

Embodiments of the invention include systems and methods for assessing network security and integrity, and more particularly to detecting and mitigating vulnerabilities in communication networks. In embodiments, a client device connects wirelessly to a cellular network based on configuration parameters. A companion device mirrors the client device's connection to the cellular network based on the configuration parameters. The companion device observes at least one characteristic indicative of one or more vulnerabilities of the cellular network and communicates related information to the client device. The client device provides a vulnerability assessment based on the information.

20 Claims, 7 Drawing Sheets

FIG. 6 ional Patent Application 63/602,247, filed 22 Nov. 2023, which is incorporated by reference herein in its entirety.

VULNERABILITY DETECTION AND MITIGATION IN CELLULAR NETWORKS

CROSS-REFERENCE TO RELATED APPLICATIONS

This application claims the benefit of U.S. Provisional Patent Application 63/602,247, filed 22 Nov. 2023, which is incorporated by reference herein in its entirety.

TECHNICAL FIELD

Various aspects of the present disclosure relate generally to systems and methods for assessing network security and integrity and, more particularly, to systems and methods for detecting and mitigating vulnerabilities in communication networks.

BACKGROUND

In an era where over 97% of Americans depend on cellular networks for daily communication and connectivity, the need for robust defensive capabilities in mobile networks has become increasingly urgent. The current state of the art falls short of addressing the security flaws that permeate these networks, exposing users to well-documented threats. Today's commercially available mobile devices are ill-equipped to detect and protect against these vulnerabilities.

Today's smartphone users, for example, cannot detect vulnerable infrastructures, active attacks, or state surveillance in cellular networks. This is at least partially because users cannot access the radio-level traffic of their mobile devices without drastically compromising endpoint security by "jailbreaking" or "rooting" their device's operating system. Android and iOS Application Programming Interfaces (APIs) intentionally protect granular network telemetry to prevent malicious behavior by mobile app developers. A drawback of this obfuscation strategy, however, is that users must blindly trust both their devices and mobile network service providers.

Meanwhile, countless publications from every level of the U.S. Government, research organizations, and academia highlight vulnerabilities in LTE and 5G networks. Radio Access Technology types continue to expand, with GSM, CDMA, UMTS, LTE, and 5G, thereby increasing the variability of network conditions and security states in different global environments. Users may, for example, unknowingly encounter vulnerable wireless telecommunications infrastructures from network misconfigurations, malicious actors' active exploitation, or nation-state relations with telecommunications companies associated with state surveillance. Infrastructure vulnerabilities, active attacks, and service provider integrity create risks, none of which are detectable with native resources on today's iOS or Android smartphones. The inability to detect vulnerabilities on current smartphones, especially while using untrusted service providers abroad, results in an acute lack of security awareness.

There are presently no commercial technologies that enable users to assess and detect attacks in the wireless components of cellular networks. Users, including government officials, first responders, military service members in contested operational environments, and anyone using a smartphone, are expected to trust their wireless provider to deliver a secure network with no provable means of verification.

There is therefore a need for a solution that enables users to view security characterizations of the networks to which they are connected, while not requiring they compromise their phones' operating systems by rooting/jailbreaking their devices to access physical, data, and network layer traffic.

The present disclosure is directed to overcoming one or more of these above-referenced challenges.

SUMMARY OF THE DISCLOSURE

According to certain aspects of the disclosure, systems, methods, and computer readable media are disclosed for detecting and mitigating vulnerabilities in communication networks.

Cellular communications on smartphones and other mobile devices have a significant security gap where consumers must blindly trust their network service providers and mobile operating systems. Android and iOS operating systems, for example, do not display any security indicators concerning the radio access networks serving user devices, and there is no current market solution for defending and identifying vulnerabilities in Layers 1 through 3 of cellular communications on commercial networks. In addition, Android and iOS application programming interfaces ("APIs") obfuscate critical security features of the associated networks, further limiting an end user's ability to verify the integrity of their network connection and take any corresponding mitigating actions.

Embodiments of the present invention address the need for solutions that assess the security and integrity of wireless networks by mirroring a mobile device's network connection with a companion device. Exemplary embodiments include a system for vulnerability detection and mitigation in a cellular network, wherein the system comprises a client device and a companion device. The client device is wirelessly connected to the cellular network based on one or more network configuration parameters. The companion device comprises a cellular modem and a client interface. The companion device is configured to receive, via the client interface, one or more network configuration parameters from the client device; wirelessly connect to the cellular network via the cellular modem; authenticate to the cellular network based on the one or more network configuration parameters; observe at least one characteristic indicative of one or more potential vulnerabilities of the cellular network; and transmit, via the client interface, information about the at least one characteristic to the client device. The client device can then provide a vulnerability assessment, via a graphical user interface, to a user of the client device, based on the received information.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and, together with the description, serve to explain the principles of the disclosed technology.

DETAILED DESCRIPTION

Various aspects of the present disclosure relate generally to systems and methods for assessing network security and integrity and, more particularly, to systems and methods for detecting and mitigating vulnerabilities in communication networks.

Figure 1:
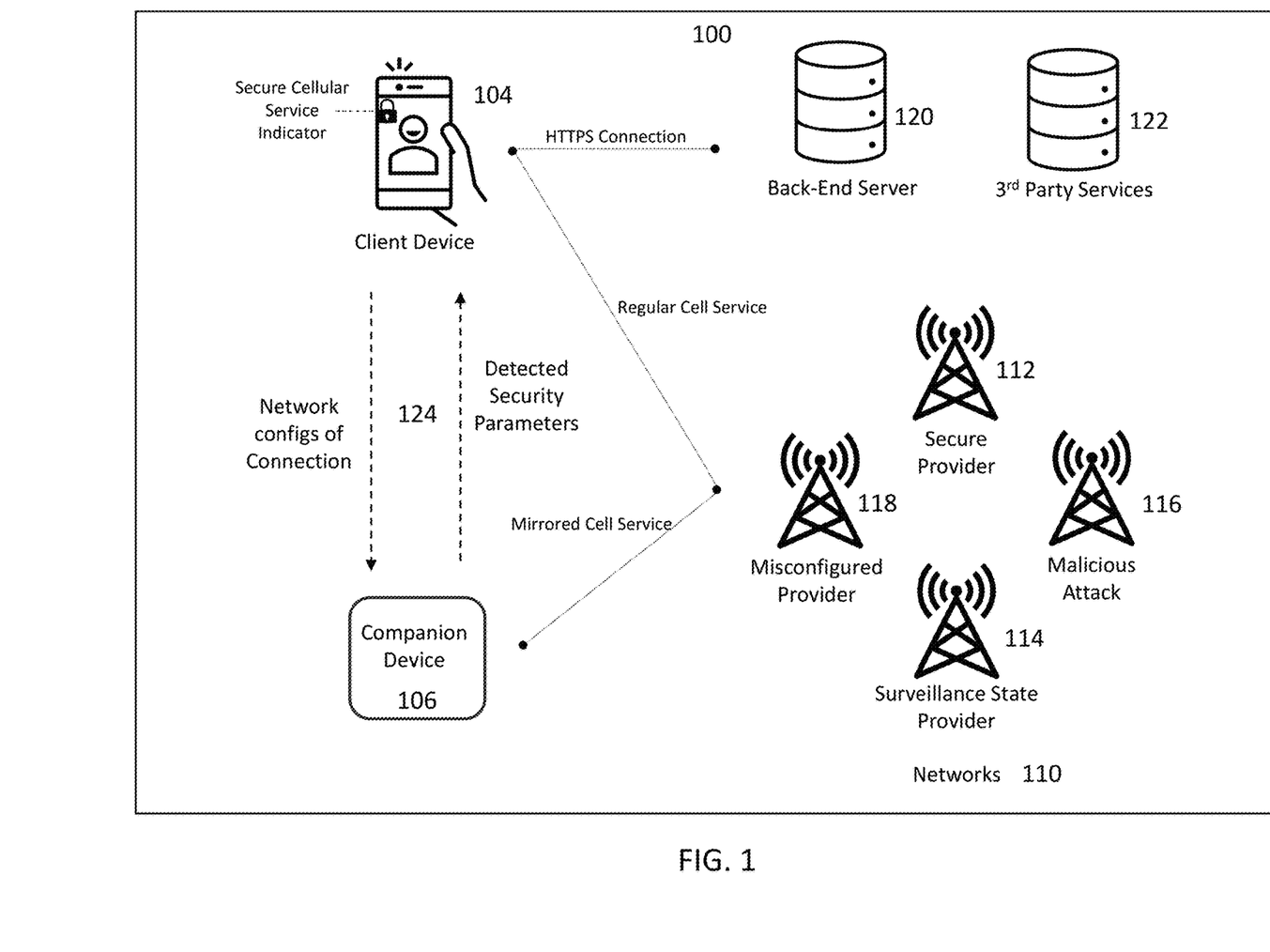
FIG. 1 depicts an exemplary environment for embodying systems and methods of the present invention.

FIG. 1 depicts an exemplary environment 100 for embodying systems and methods of the present invention. Embodiments comprise a system 102, which can comprise a client device 104 and a companion device 106. Client device 104 can be a computing device, such as a mobile phone (e.g. a smart phone), tablet, notebook/laptop/desktop computer, smart device, wearable device, or an IoT device comprising a graphical user interface and one or more wireless communication means. Companion device 106 can be a computing device like those mentioned above, but it does not require a graphical user interface. In embodiments, client device 104 can communicate with companion device 106 via a connection 124. Connection 124 can, for example, be a wireless connection and utilize Bluetooth, Wi-Fi, NFC, and/or other wireless communication protocols. Connection 124 can be a wired connection and utilize USB, serial, and/or other wired communication protocols.

Environment 100 can further comprise one or more networks 110, which can be a cellular radio access network, a Wi-Fi network, a Bluetooth network, and/or another wireless network. Embodiments of network(s) 110 can comprise one or more network infrastructure components such as one or more network towers, access points, hubs, routers, switches, and/or other network components. Network(s) 110 can also comprise one or more network entities such as secure providers 112, surveillance state providers 114, malicious attackers 116, and/or misconfigured providers 118. Network entities 112-118 can provide network access and/or services (e.g., cellular network access and services) across network(s) 110 to client device 104 and companion device 106.

Environment 100 can further comprise one or more back-end resources including one or more servers 120 and third-party services 122. Back-end server(s) 120 and third-party services 122 can, for example, provide database functionality and/or other services/resources to client device 104, and more particularly to one or more applications executing on client device 104.

Figure 2:
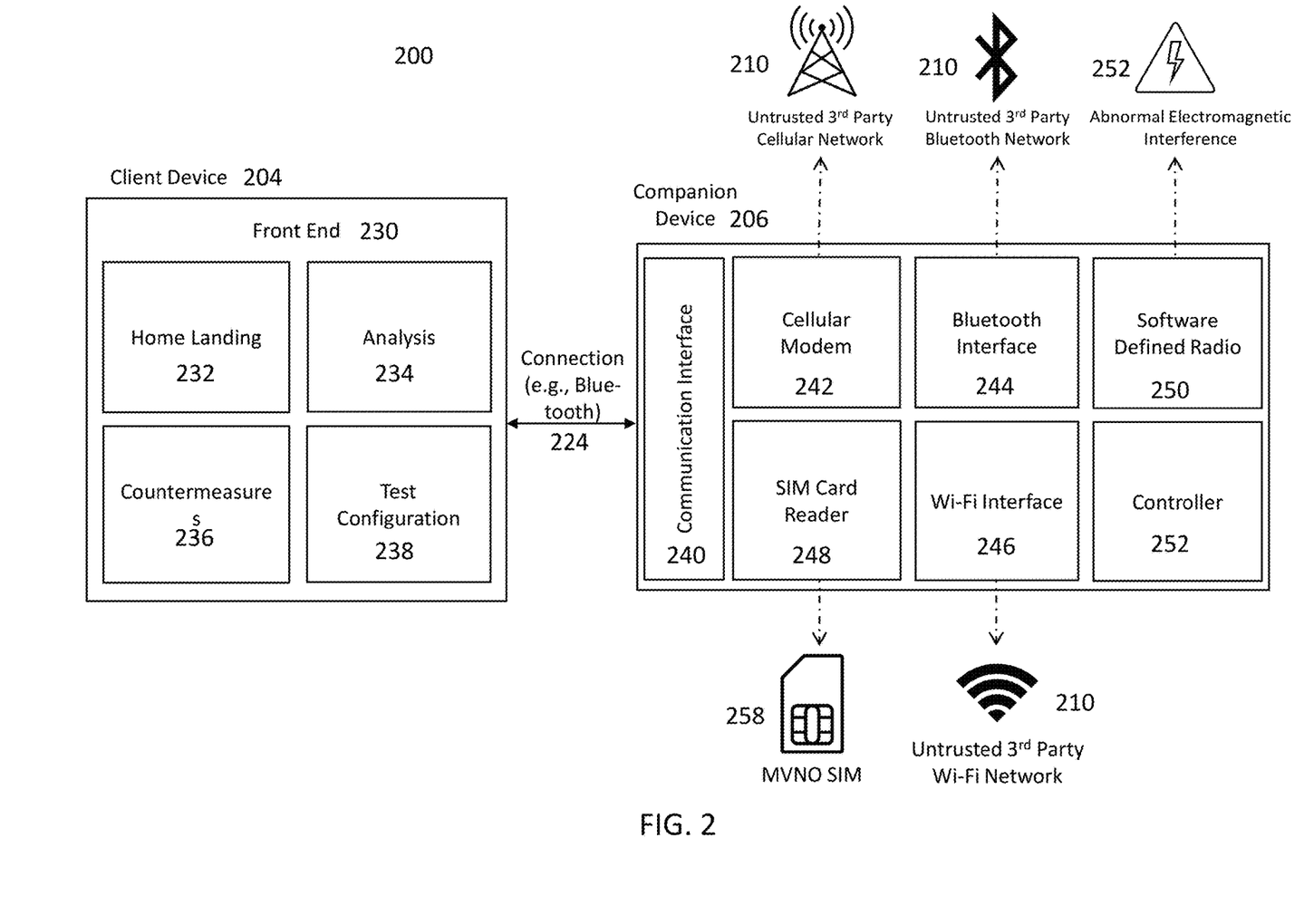
FIG. 2 depicts a block diagram schematically showing an exemplary system of the present invention.

FIG. 2 depicts a block diagram schematically showing an exemplary system 200. System 200 can include a client device 204, a companion device 206, and one or more networks 210. Client device 204 can communicate with companion device 206 via a connection 224 (e.g., connection 124 in FIG. 1). Client device 204 can include an operating system (e.g., iOS or Android mobile operating system) and one or more software applications (e.g., mobile applications or "apps"). The application(s) can include a computer program configured to provide a graphical front end 230 for users to interface with embodiments of the invention. Front end 230 can comprise one or more graphical components and/or pages, including, for example, a home landing page 232, an analysis page 234, a countermeasures page 236, and/or a test configuration page 238. Any number or configuration of pages can be used without departing from the scope of the invention.

Home landing page 232 can be a starting point for a user wishing to interact with embodiments of the invention. Analysis page 234 can provide one or more network parameters, configuration settings, or other information relevant to a user of the invention. Countermeasures page 236 can provide one or more recommended actions for a user to take in response to one or more vulnerabilities, anomalies, insecure configuration characteristics, or other actionable intelligence identified by embodiments of the invention. Test configuration page 238 can allow the user to input, configure, and/or retrieve certain network parameters that enable companion device 206 to mirror the client device's 204 connection to network(s) 210.

Companion device 206 can, for example, be a separate device from client device 204 and/or a device that attaches to, plugs into, or is installed within client device 204. In embodiments, companion device 206 can include one or more components such as a client communication interface 240, a cellular modem 242, a Bluetooth interface 244, a Wi-Fi interface 246, a SIM card reader 248, a software defined radio 250, and/or a controller 252.

Client communication interface 240 can be a wired or wireless communication interface for communicating directly with client device 204. For example, client communication interface can be a Bluetooth interface. Cellular modem 242, Bluetooth interface 244, and Wi-Fi interface 246 can be configured to connect to and communicate across one or more of the corresponding networks 210 that are to be assessed. In embodiments, cellular modem 242 is a global/universal modem. SIM card reader 248 can be configured to read the contents of a Subscriber Identity Module (SIM) card 258 that can be inserted into or otherwise connected to companion device 206. In embodiments, SIM card 258 can be a Mobile Virtual Network Operator (MVNO) SIM card that permits connectivity with a plurality of cellular network service providers. The companion device can then continuously mirror a user's network connection even as the user bounces between untrusted third-party networks in different countries. The combination of a global modem and an MVNO SIM can enable highly flexible connectivity anywhere in the world. In some embodiments, companion device 206 can have two or more cellular modems and SIM card readers, thereby permitting multiple simultaneous connections. This may be advantageous if, for example, a user wishes to simultaneously analyze network connections to two or more third-party networks in the same geographic region.

Software defined radio (SDR) 250 can be configured to perform spectrum analysis across a range of radio communication protocols. SDR 250 can be configured to monitor the spectrum for vulnerabilities or malicious attacks such as jamming activities that could impair the physical layer connection of client device 204 to network(s) 210.

Controller 252 can be a processing component configured to control the operations of companion device 206. Controller 252 can include one or more subcomponents such as a CPU, microchip, memory, PCB, bus, and/or other circuitry for connecting to and controlling the various components of companion device 206.

Figure 3:
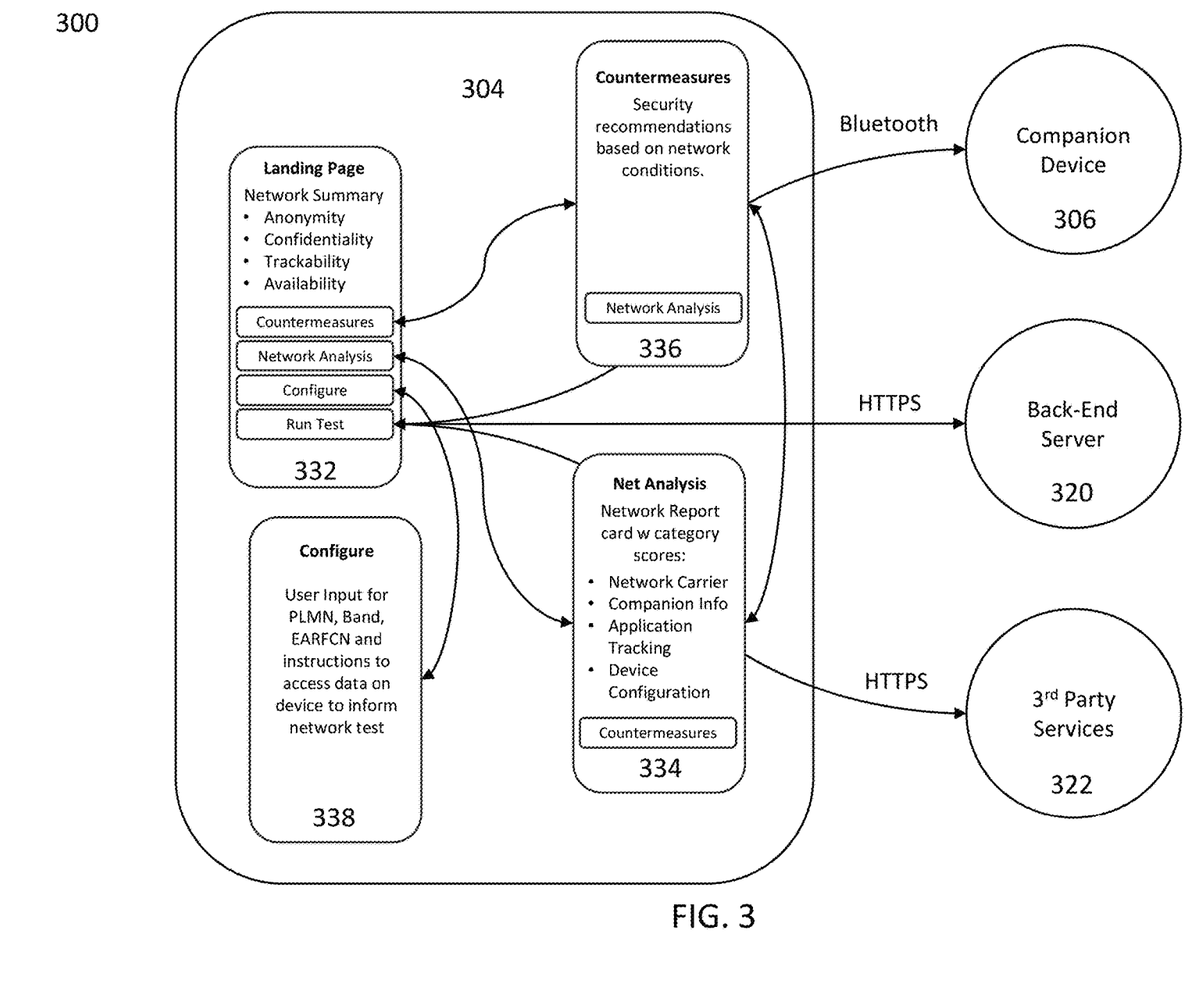
FIG. 3 depicts a flowchart of an exemplary method of the present invention.

FIG. 3 depicts a flowchart of an exemplary method 300 for identifying and mitigating vulnerabilities in a network. Method 300 can start with a user interacting with home landing page 332. The user can next proceed (e.g., by selecting a corresponding user interface element) to a test configuration page 338, where the user can retrieve and/or input one or more network configuration parameters needed to run a vulnerability test. For example, the parameters can include a Public Land Mobile Network (PLMN), a network band, an Access Point Name (APN), a bandwidth, a deployment type, and/or an Absolute Radio Frequency Channel Number (ARFCN). In some embodiments, the user can query the network service provider to which the client device is connected to obtain this information (e.g., by dialing *3001 #12345 #* on their client device) and then copy the resulting information to test configuration page 238. In embodiments, the client device can automatically query one or more of the network configuration parameters through its operating system's API. Having supplied one or more network configuration parameters (i.e., manually, automatically, or a combination of the two), the user can choose to execute a test.

To execute a test, the client device (e.g., client device 104) can communicate the network configuration parameters to companion device 306 (e.g., via a Bluetooth communication protocol). Companion device 306 can then use the network configuration parameters to mirror the client device's connection to the network (i.e., access and authenticate to the same network service provider, on the same band, with the same ARFCN, etc.). With a mirrored connection, companion device 306 can identify more information about the network than would otherwise be accessible to the client device alone because client device manufacturers generally do not permit access to radio-level traffic. For example, mobile phone manufacturers generally do not permit users to view the network data packets that are transmitted and received by their phones. Gaining this level of granularity can offer significant insight concerning one or more vulnerabilities that may be present in a network connection.

After successfully mirroring the client device's 304 connection, companion device 306 can observe one or more parameters, characteristics, or behaviors (collectively the "observed characteristics") associated with a network. In embodiments, companion device 306 can capture one or more network data packets that are communicated between the companion device 306 and the network. Companion device 306 can parse the one or more network data packets to extract the observed characteristics from a packet's header and/or payload and then forward the parsed data to the client device 304 (e.g., via a Bluetooth communication protocol). The observed characteristics to extract can include, for example, an integrity cipher, a confidentiality cipher, the presence of downgrade messaging and/or signal interference, the globally unique temporary ID ("GUTI") refresh rate, and the use of GUTI randomization and/or encryption of one or more identifiers (e.g., IMSI, SUPI, and IMEI) during transmission. In alternative embodiments, the companion device 306 can capture one or more network data packets, or portions of one or more network data packets, and transmit the packet(s) (or portions thereof) to another device (e.g., client device 304, back-end server 302, and/or third-party services 322) to be parsed.

Client device 304 can perform an analysis of the observed characteristics locally on the client device and/or query back-end server 320 and/or third-party services 322 (e.g., via HTTPS protocol communications) for some or all of the analysis operations. Back-end server 320 and/or third-party services 322 can optionally provide additional resources and/or characteristics to support the analysis operations. For example, back-end server 320 can provide known information about an identified network service provider's reputation, data sharing agreements, and user privacy implications. Third-party services 322 can, for example, provide real-time information about current congestion and/or outages on the network, active security breaches or compromises, public network vulnerabilities, and service provider terms of service. Any or all of the information gathered by the client device 304 from one or more resources can be used to provide the user with a current analysis or assessment (including identification of one or more vulnerabilities and/or mitigations) of their network connection.

The results of the analysis can be presented on analysis page 334, wherein the results can identify one or more vulnerabilities associated with the user's current network configuration, connection, service provider, etc. The user can also view one or more suggested countermeasures on countermeasures page 336.

In alternative embodiments of the invention, companion device 306 can comprise a front end (e.g., similar to front end 230) and perform some or all of the functions of client device 304 described herein. In other words, after mirroring the connection of client device 304 and observing one or more network characteristics, companion device 306 can perform a network security assessment and present the results, along with any corresponding countermeasures, to the user.

Figure 4:
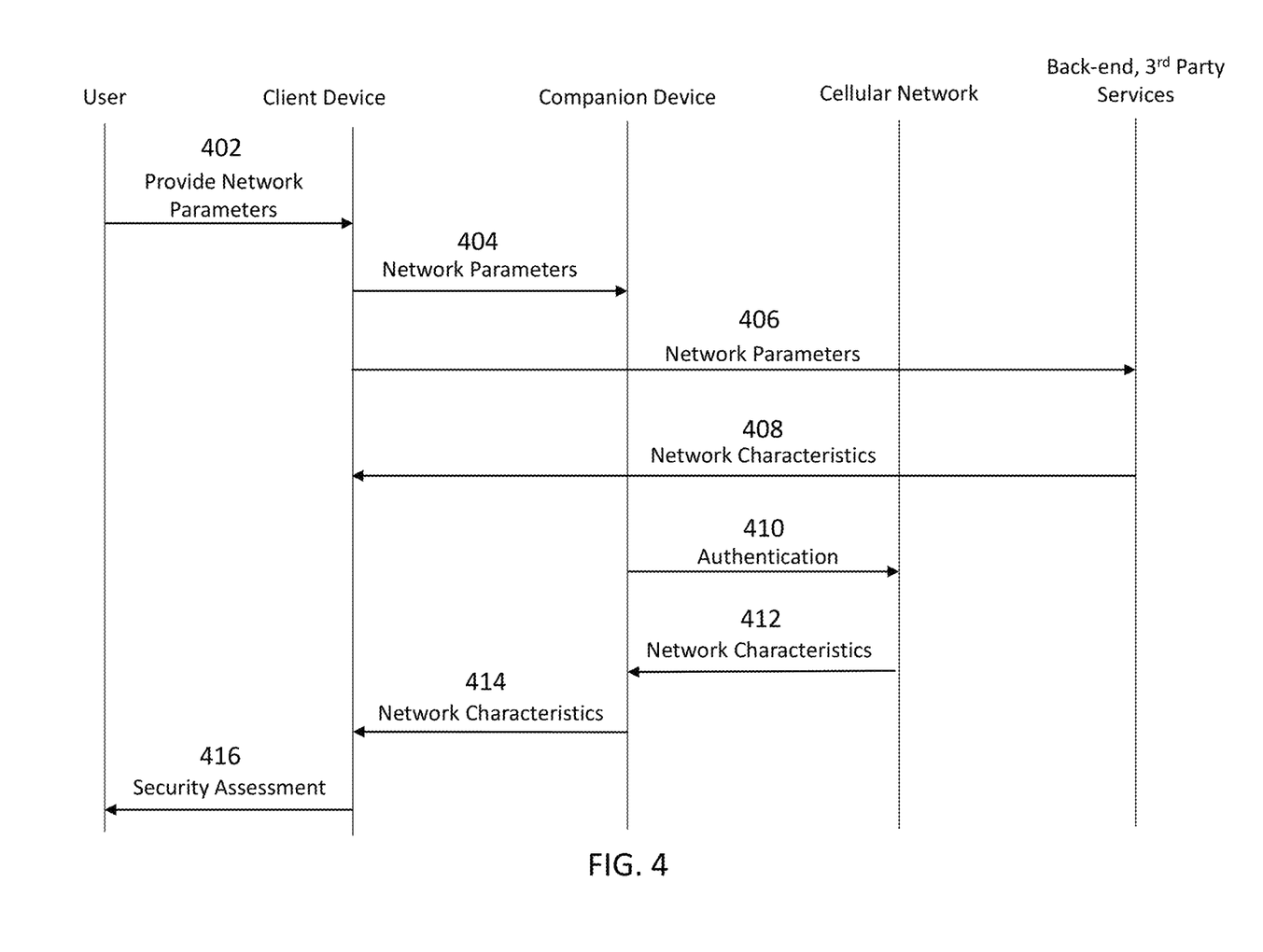
FIG. 4 depicts an exemplary sequence diagram of the movement of information in accordance with embodiments of the present invention.

FIG. 4 depicts an exemplary sequence diagram of the movement of information in accordance with embodiments of the present invention. At 402, a user can retrieve and/or input one or more network configuration parameters into a mobile application on the client device. At 404, the client device can communicate the network configuration parameters to the companion device (e.g., as a JSON file). At 406, the client device can also communicate some or all of the network configuration parameters to the back-end server and/or one or more third-party services. At 408, the back-end server and/or one or more third-party services can communicate characteristics or other information about the network to the client device (e.g., as JSON files). Such characteristics can include, for example, the corresponding service provider's terms of service, reputation, data sharing agreements, and other policy information that can inform a vulnerability analysis or assessment. In embodiments, the information can be used to assess a general integrity of the service provider. At 410, the companion device can authenticate with the network service provider based on the network configuration parameters provided by the client device (i.e., the companion device mirrors the client device's connection). At 412, the companion device can observe detailed information about the network by, for example, parsing the network communications (e.g., data packets) to extract certain characteristics of interest. Such details can include, for example, protocol implementation security characteristics. At 414, the companion device can communicate the observed characteristics to the client device. At 416, the client device, via a mobile application on the client device, can present to the user a security/vulnerability assessment based on the observed characteristics and information received from one or both of the companion device and the back-end server and/or one or more third-party services. The assessment can include one or more security scores according to one or more factors such as availability (e.g., the status of one or more network resources and/or network performance indicators), anonymity (e.g., how does the network anonymize user activity), trackability (e.g., how easily can users be tracked while communicating on the network), and confidentiality (e.g., how securely are communications hidden on the network). The security scores can be weighted according to one or more scoring methodologies and can be associated with one or more summary assessments. For example, the mobile application can conclude that the connection is secure or unsecure or that there is a low, medium, or high vulnerability risk. The mobile application can display one or more graphical objects (e.g., icons or widgets) indicative of the summary assessment. A lock icon, for example, can indicate that the connection is secure and/or has a low vulnerability risk. In embodiments, the graphical object can be provided by the client device's operating system and/or one or more applications running on the client device.

In embodiments, the analysis to generate the security assessment can be based on one or more predefined tables that assign scores and weights to particular vulnerabilities. The analysis can be based on one or more summations (or other mathematical operations) of the scores and weights that correspond to one or more detected vulnerabilities. More severe vulnerabilities can, for example, be weighted more heavily than less severe vulnerabilities. The more vulnerabilities that are present and/or the greater the severity of the detected vulnerabilities, the worse the security score.

In embodiments, one or more observed characteristics can be communicated as input to a machine learning model (e.g., provided by one or more back-end servers and/or third-party services) trained on network security characteristics and vulnerabilities. The model can output one or more vulnerabilities, scores, weights, and/or security assessments to the client device for use as input in determining and/or presenting a security assessment.

The security assessment can include and/or link to one or more countermeasures that the user can take to remedy or mitigate one or more vulnerability risks. For example, embodiments of the invention can assess that the network is using a weak or missing cryptographic cipher and subsequently recommend that a user avoid sensitive (e.g., banking) transactions over that network.

In another example, the invention can assess that the network's authenticity is questionable. More specifically, networks regularly identify themselves using "mobile network codes" and "mobile country codes" to create globally unique PLMNs. Providers in different countries lease frequencies from governments that correspond to bands and ARFCNs. The combination of a PLMN, band, and ARFCN are unique to each service provider and are publicly known values. If the invention detects an inconsistency in this information based on observed characteristics, the network may be inauthentic and possibly associated with a rogue, malicious third-party infrastructure. The invention can then provide a security assessment commensurate with such a risk and/or a corresponding countermeasure (e.g., advise the user to switch to a different network). It should be understood by those of ordinary skill in the art that there are many potential vulnerabilities in communications networks and corresponding countermeasures, and the list will constantly evolve with new technologies, practices, and malicious behaviors. The vulnerabilities and countermeasures identified in this disclosure are therefore exemplary only, and the invention can be configured to observe vulnerabilities and countermeasures that are known now and are discovered in the future.

Figure 5:
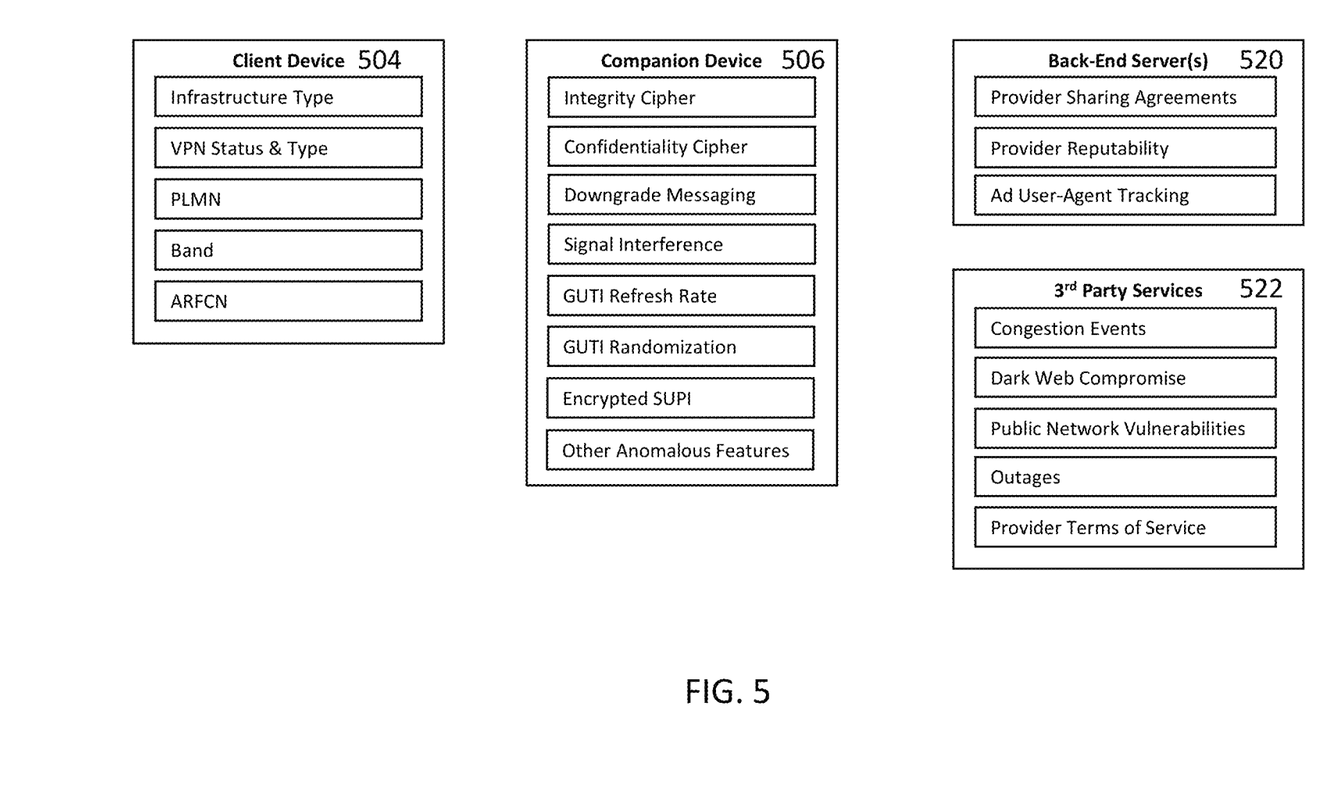
FIG. 5 depicts a chart of a plurality of exemplary vulnerability considerations in accordance with embodiments of the invention.

FIG. 5 depicts a chart of a plurality of exemplary vulnerability considerations, organized by source, in accordance with embodiments of the invention. Vulnerability considerations based on information provided at the client device 504 can, for example, include the infrastructure type, the VPN status and type, and/or the PLMN, band, and ARFCN. Vulnerability considerations based on characteristics observed by the companion device 506 can, for example, include the integrity cipher, confidentiality cipher, the presence of downgrade messaging or signal interference, the GUTI refresh rate, the use of GUTI randomization, an encrypted Subscription Permanent Identifier ("SUPI"), and/or other anomalous features. Vulnerability considerations based on information provided by one or more back-end servers 520 can, for example, include service provider data sharing agreements, the provider's reputability, and/or the use of advertising user-agent tracking technologies. Vulnerability considerations based on information provided by one or more third-party services 522 can, for example, include the detection of network congestion events, a service provider's history of security compromises (e.g., hacks, ransomware attacks, or other data exposures identified publicly or on the dark web), known network vulnerabilities, network outages, and/or a service provider's terms of service.

Figure 6:
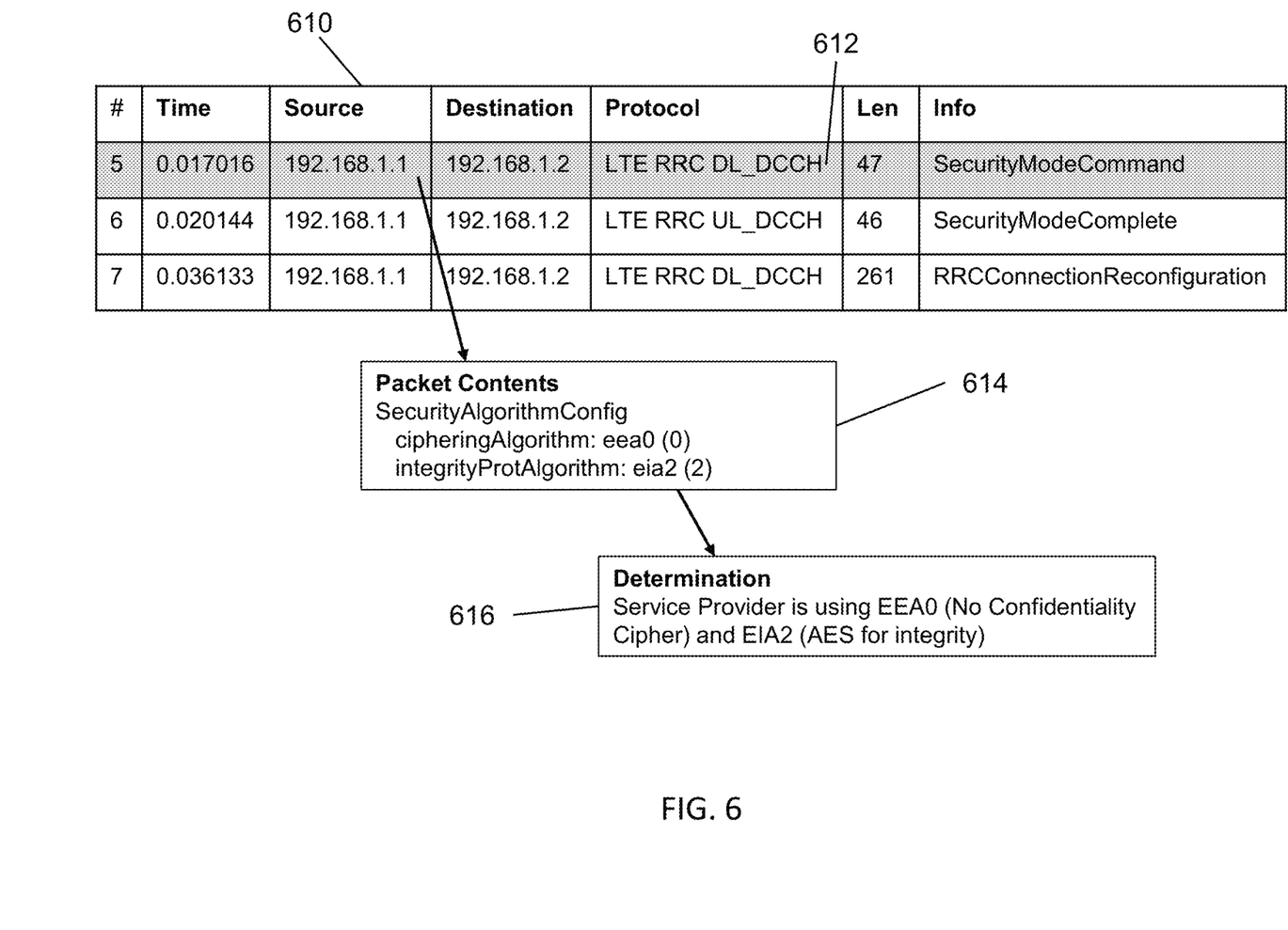
FIG. 6 depicts a sample network packet capture in accordance with embodiments of the invention.

FIG. 6 depicts a sample network data packet capture in accordance with embodiments of the invention. As discussed above, a companion device (e.g., companion device 106) can capture (i.e., record for later analysis) the network data packets that it sends and/or receives while communicating with a wireless network and parse one or more of the data packets to extract relevant characteristics. Three sample packets are shown in table 610. One of the packets 612 includes parsed information 614 about the ciphering algorithms that the network is using. The companion device can send the parsed information 614 to the client device, and the client device can determine 616, for example, that a 4G/LTE network is using EEA0 (i.e., no ciphering algorithm) and EIA2 (i.e., an integrity ciphering algorithm with checksum modification verification). This means no encryption is being applied at the radio level for subsequent communications over this connection. This may be a misconfiguration or intentional decision by the service provider to save computational resources. A passive observer could potentially view these plaintext communications. In embodiments, the companion device parses network data packets for these types of security fields and sends them to the client device. With this information, for example, the mobile application can provide an analysis that identifies this vulnerability and propose one or more countermeasures, such as utilizing a reputable VPN service.

Some of the example embodiments described herein are directed to a workflow in which a user is seeking a security and integrity assessment of a particular network at a particular moment in time. In the same or alternative embodiments, however, a user may wish to conduct a security and/or integrity-focused survey of one or more networks across one or more geographic regions at one or more times. Such a survey can aggregate a plurality of assessments to provide the user with one or more visual representations (e.g., heatmaps) of one or more of the observed characteristics and/or inferences therefrom. Characteristic and/or analysis data can, for example, be plotted on a map to provide an assessment of one or more networks over a geographic region (e.g., a city or state). Such data can also be plotted over time to reflect historical changes in security and integrity.

In embodiments, the companion device can collect and store survey information (i.e., observed characteristic data) in memory, a file, and/or a database (each of which can be local or remote to the companion device). For example, the companion device can store survey information in an XML (extensible markup language) file on the companion device. More specifically, the XML file can be written in Keyhole Markup Language (KML), which is an XML format that can store survey information together with geographic information. KML files can, for example, be interpreted by geographic visualization programs and/or services such as GOOGLE EARTH, thereby enabling users to visualize geographically associated information (e.g., survey information) directly on a corresponding map. As the companion device observes one or more network characteristics associated with a particular network, at a particular time, and/or at a particular geographic region, the companion device can add corresponding entries to the KML file. Geographic information can be stored in the form of three-dimensional coordinates (i.e., latitude, longitude, altitude) provided by the modem, the network, and/or an optional GPS (global positioning system) radio within the companion device. The companion device can then transmit the KML file (or other data structure) to the client device for analysis, aggregation, and/or presentation to the user.

Figure 7A:
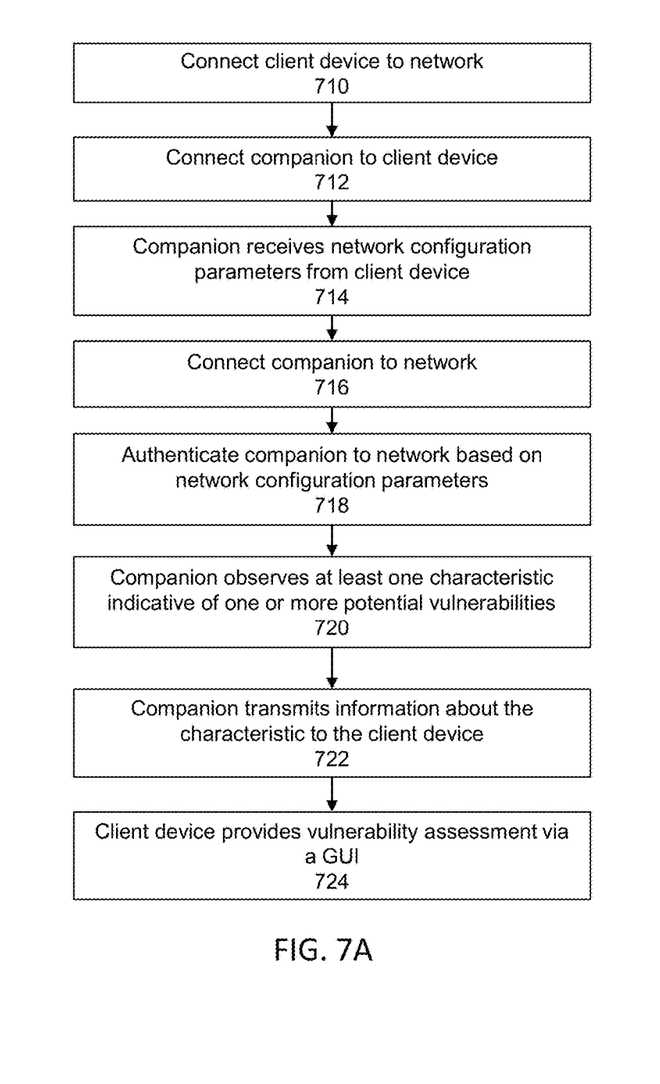
FIGS. 7A-7B depict flowcharts of exemplary methods of the present invention.

FIG. 7A depicts an exemplary method for assessing a cellular network's security. A client device is first connected to a cellular network based on one or more network configuration parameters at step 710. At step 712, a companion device is connected to the client device, wherein the companion device comprises a cellular modem and a client interface. At step 714, the companion device receives, via the client interface, the one or more network configuration parameters from the client device. At step 716, the companion device is connected to the cellular network. At step 718, the companion device is authenticated to the cellular network based on the one or more network configuration parameters. At step 720, the companion device observes at least one characteristic indicative of one or more potential vulnerabilities of the cellular network. At step 722, the companion device transmits, via the client interface, information about the at least one characteristic to the client device. Finally, at step 724, the client device provides a vulnerability assessment via a graphical user interface to a user of the client device based on the information.

Figure 7B:
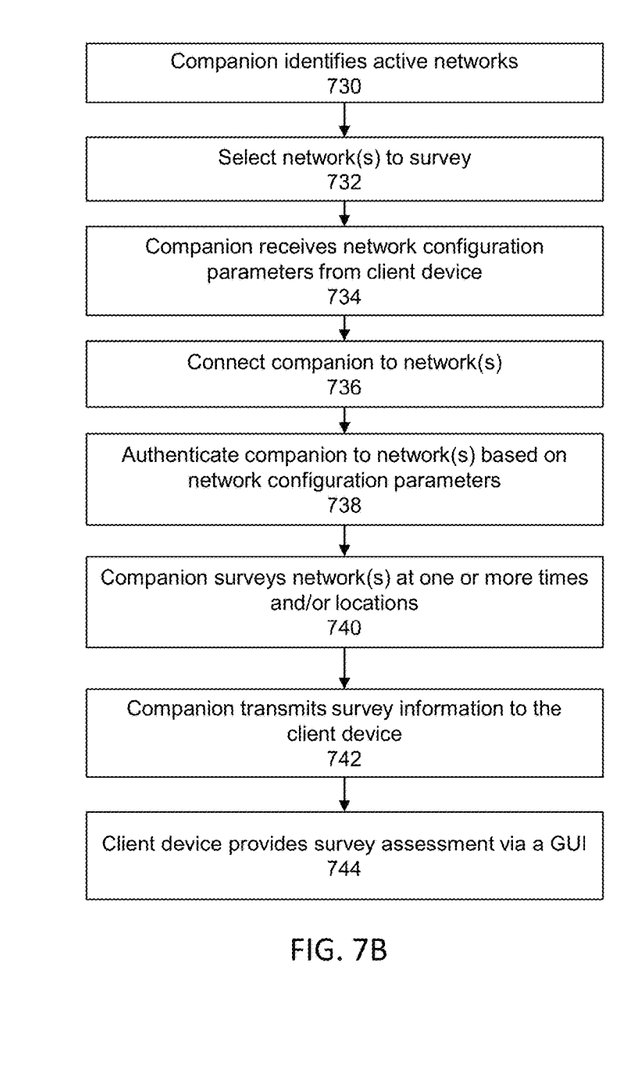

FIG. 7B depicts an exemplary method for surveying the security and/or integrity of one or more cellular networks. At step 730, the companion device identifies one or more active cellular networks. At step 732, a client device that is connected to the companion device via a client interface selects (e.g., based on user input at the client device) one or more of the cellular networks to survey. At step 734, the companion device receives from the client device one or more network configuration parameters associated with the one or more selected cellular networks to survey. At step 736, the companion device connects to the one or more cellular networks to survey and at step 738, authenticates to those networks based on the one or more network configuration parameters. At step 740, the companion device surveys the one or more cellular networks at one or more times and/or one or more geographic locations. At step 742, the companion device transmits, via the client interface, survey information, including time and/or geographic information, to the client device. Finally, at step 744, the client device provides survey assessment information to a user via a graphical user interface.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for vulnerability detection and mitigation in a cellular network, the system comprising:
   a client device, wherein the client device is wirelessly connected to the cellular network based on one or more network configuration parameters; and
   a companion device, wherein the companion device comprises:
      a cellular modem; and
      a client interface;
      wherein the companion device is configured to:
         receive, via the client interface, the one or more network configuration parameters from the client device;
         wirelessly connect to the cellular network via the cellular modem;
         authenticate to the cellular network based on the one or more network configuration parameters;
         observe at least one characteristic indicative of one or more potential vulnerabilities of the cellular network; and
         transmit, via the client interface, information about the at least one characteristic to the client device;
      wherein the client device provides a vulnerability assessment, via a graphical user interface, to a user of the client device, based on the information.

2. The system of claim 1, wherein the vulnerability assessment comprises at least one summary assessment selected from the group of an anonymity assessment, an availability assessment, a confidentiality assessment, and a trackability assessment.

3. The system of claim 2, wherein the at least one summary assessment comprises a security indicator that indicates a level of security associated with the cellular network.

4. The system of claim 1, wherein the vulnerability assessment comprises at least one countermeasure, wherein the at least one countermeasure is a recommended action that the user of the client device can take to mitigate at least one of the one or more vulnerabilities of the cellular network.

5. The system of claim 1, wherein the companion device further comprises a SIM card reader, and wherein the companion device is configured to read the contents of a subscriber identity module card and connect to the cellular network based on the contents of the subscriber identity module card.

6. The system of claim 1, wherein the at least one characteristic comprises an integrity cipher, a confidentiality cipher, an indicator of downgrade messaging, an indicator of signal interference, a GUTI refresh rate, and/or a GUTI randomization.

7. The system of claim 1, wherein the one or more potential vulnerabilities comprise a weak or missing encryption cipher.

8. The system of claim 1, wherein the client interface is a wireless interface, and the companion device only communicates with the client device via the wireless interface.

9. The system of claim 1, further comprising:
   at least one server computer, wherein the server computer is configured to:
      receive, from the client device, at least one of the one or more network configuration parameters; and
      transmit, to the client device, information about the cellular network's integrity.

10. The system of claim 9, wherein the vulnerability assessment is further based on the information about the cellular network's integrity.

11. A method for assessing a cellular network's security, the method comprising:
   connecting a client device to the cellular network based on one or more network configuration parameters;
   connecting a companion device to the client device, wherein the companion device comprises:
      a cellular modem; and
      a client interface;
   receiving at the companion device, via the client interface, the one or more network configuration parameters from the client device;
   connecting the companion device to the cellular network via the cellular modem;

authenticating the companion device to the cellular network based on the one or more network configuration parameters;

observing, at the companion device, at least one characteristic indicative of one or more potential vulnerabilities of the cellular network; and transmitting from the companion device, via the client interface, information about the at least one characteristic to the client device;

providing, at the client device, a vulnerability assessment via a graphical user interface to a user of the client device based on the information.

12. The method of claim 11, wherein the vulnerability assessment comprises at least one summary assessment selected from the group of an anonymity assessment, an availability assessment, a confidentiality assessment, and a trackability assessment.

13. The method of claim 12, wherein the at least one summary assessment comprises a security indicator that indicates a level of security associated with the cellular network.

14. The method of claim 11, wherein the vulnerability assessment comprises at least one countermeasure, wherein the at least one countermeasure is a recommended action that the user of the client device can take to mitigate at least one of the one or more vulnerabilities of the cellular network.

15. The method of claim 11, wherein the companion device further comprises a SIM card reader, and wherein the method further comprises reading, by the companion device, the contents of a subscriber identity module card and connecting to the cellular network based on the contents of the subscriber identity module card.

16. The method of claim 11, wherein the at least one characteristic comprises an integrity cipher, a confidentiality cipher, an indicator of downgrade messaging, an indicator of signal interference, a GUTI refresh rate, and/or a GUTI randomization.

17. The method of claim 11, wherein the one or more vulnerabilities comprise a weak or missing encryption cipher.

18. The method of claim 11, wherein the client interface is a wireless interface, and the companion device only communicates with the client device via the wireless interface.

19. The method of claim 11, further comprising:
receiving, from the client device, at least one of the one or more network configuration parameters at a server computer; and
transmit, to the client device, information about the cellular network's integrity from the server computer.

20. The system of claim 19, wherein the vulnerability assessment is further based on the information about the cellular network's integrity.

* * * * *